(No Model.)
T. SAWYER.
GATE.
No. 605,748.
Patented June 14, 1898.
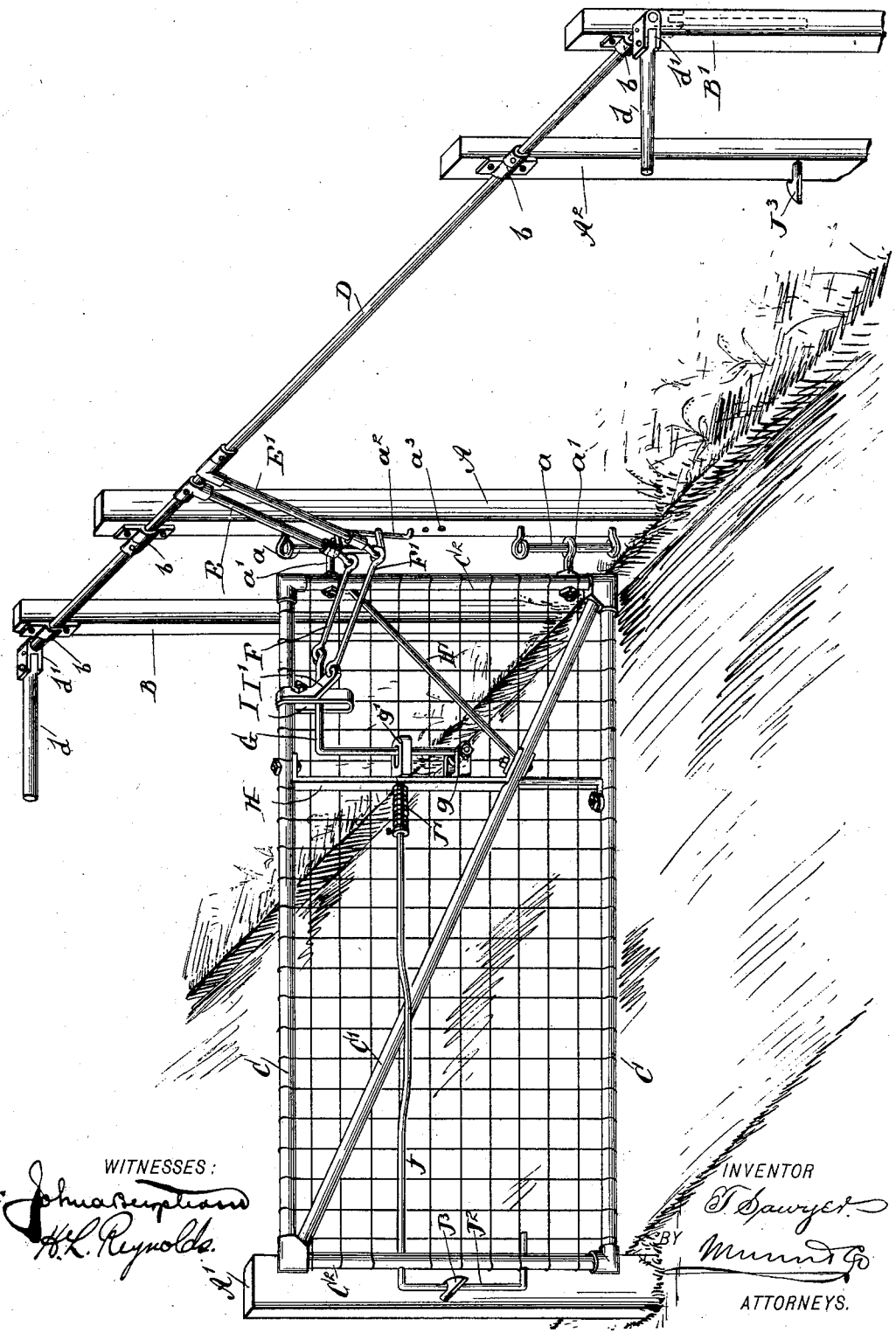
WITNESSES:
INVENTOR
T. Sawyer
BY
ATTORNEYS.

UNITED STATES PATENT OFFICE.

THEODORE SAWYER, OF TOWANDA, ILLINOIS.

GATE.

SPECIFICATION forming part of Letters Patent No. 605,748, dated June 14, 1898.

Application filed January 14, 1898. Serial No. 666,643. (No model.)

*To all whom it may concern:*

Be it known that I, THEODORE SAWYER, of Towanda, in the county of McLean and State of Illinois, have invented new and useful Improvements in Gates, of which the following is a full, clear, and exact description.

My invention relates to an improvement in gates of that class which are provided with operating-handles located at a sufficient distance from the gate so that the gate may be opened and closed by a person in a carriage.

Reference is to be had to the accompanying drawings, forming a part of this specification, in which the figure is a perspective view of the gate closed.

The frame of the gate is preferably made of iron pipes united at the corners of the gates by screwing into suitable connections, the pipes being for this purpose threaded right and left, as may be necessary to enable the parts to be readily assembled. The pipes C form the top and bottom edges of the gate and extend horizontally, while the pipes $C^2$ connect the pipes C at each end. The lower corner at the pivot end of the gate is connected with the upper corner of the swinging end of the gate by a diagonal pipe C'. The space between the pipes forming the outer edges of the gate, is filled by any suitable network formed of wire or other suitable material.

The pivot end of the gate is provided with two eyes $a'$, adapted to receive pins $a$, which are supported from the pivot-post A and at a slight distance therefrom. The gate is thus adapted to be readily raised or lowered, as circumstances may require. To support the gate at any elevation desired, a rod $a^2$ is provided with an eye at its upper end surrounding the upper pivot-pin $a$ and beneath the upper eye $a'$, attached to the gate. The lower end of the rod $a^2$ is bent to one side, and is adapted to enter one of a series of holes $a^3$ in the pivot-post A.

The latch-post A' is provided with a latch $J^3$, extending from one side thereof and located so as to be engaged by the latch J to hold the gate closed. This latch J consists of a rod extending longitudinally of the gate, and at the outer end of the gate is bent downward, so as to provide a vertically-extending member $J^2$. The end of the member $J^2$ is then bent horizontally and inward, passing through guides in the gate. As shown in the drawings, these guides for the outer end of the latch-bar are formed by holes in the outer member $C^2$ of the gate-frame. The inner end of the latch J passes through a hole formed in a bar H, which extends between the upper pipe C of the gate and the diagonal pipe C', being bolted to each of said pipes. A spring J' surrounds the inner end of the latch and presses against the bar H and a collar secured upon the latch, so as to hold the latch outward.

Upon the opposite side of the bar H and attached to the end of the latch-bar J is a slotted head $g'$, forming an eye adapted to receive the latch-operating rod or lever G, pivoted to a bracket $g$, located below the slotted head $g'$. The upper end of the lever G is bent substantially at right angles and passes through a yoke or guide I, secured to the upper pipe C of the gate. The end of the lever G is formed into an eye adapted to receive an eye correspondingly formed in a link F, similarly connected to the lower end of a crank-arm E, fixed upon a horizontal shaft D. This shaft D is journaled in boxes $b$, mounted upon the upper portions of the pivot-post A, auxiliary supporting-posts B, and a second latch-post $A^2$. This shaft extends at right angles to the gate when in its closed position and slightly above the gate. At each end said shaft is provided with an operating-handle by which it may be rotated in its bearings. These handles consist of levers $d$, pivoted in staples $d'$, secured to the shaft. The pivots of the levers are in such position that the levers $d$ may swing in a plane which includes the shaft. This construction will allow the levers to give if they come in contact with a wagon, and thus prevent breakage.

On one side of the yoke or guide I, which is secured to the gate or secured to the frame of the gate in any other suitable manner, is a bracket I', having a hole therein adapted to receive one end of a link F', the other end of this link being secured to the end of an arm E', which is loosely mounted upon the shaft D. This arm and link act as a guard for the crank-arm and its link.

The operation of my gate is as follows: Assuming the gate to be in a closed position, as shown in the drawings, the operating-levers $d$ extend horizontally from the shaft D. If one of these levers be pulled downward, the first result will be that the crank-arm E, acting upon the latch-operating lever G through the connection of the link F, will withdraw the latch-bar J, so as to free it from the catch $J^3$. As soon as free from the catch $J^3$ further rotation of the shaft will swing the gate around until the vertical portion $J^2$ of the latch-bar engages the catch $J^3$ upon the post $A^2$. The gate is thus locked open. After a carriage has passed through the gate the levers $d$, which are then in a vertical position, will be pulled upward. The operation of the parts will then be in the same order as that named, the power being applied to the gate, however, by pushing upon the link F instead of pulling, as is done when the gate is opened. When the gate is closed, the crank-arm E is in such position that the link F will pull downward somewhat upon the latch-operating lever G, so as to free the same before the gate is swung open. When the gate is in the open position, the crank-arm E is in such position that it pushes downward upon this same lever. The tendency is therefore to work this lever in the same direction with the gate in either position.

Having thus described my invention, I claim as new and desire to secure by Letters Patent—

1. A gate, having a spring-closed latch mounted to slide longitudinally upon the gate, an eye attached to said latch, a bent lever composed of a vertical and a horizontal member pivoted by the lower end of the vertical member below said latch, the vertical member of said lever passing through the eye, a yoke fixed to the frame and embracing the upper horizontal member to form a guide therefor, a shaft mounted horizontally above the gate and extending at right angles to the gate when in its closed position, a crank-arm upon the shaft near the gate-pivot, and a link connecting the said crank-arm with the upper end of the latch-operating lever on the gate, substantially as described.

2. A gate, having a spring-closed latch mounted to slide longitudinally upon the gate, an eye attached to said latch, a bent lever pivoted by its lower end below said latch, the vertical member of said lever passing through the eye, a yoke fixed to the frame and embracing the upper horizontal member to form a guide therefor, a shaft mounted horizontally above the gate and extending at right angles to the gate when in its closed position, a crank-arm upon the shaft near the gate-pivot, a link connecting the said crank-arm with the upper end of the latch-operating lever on the gate, a crank-arm mounted loosely on the shaft outside the fixed crank-arm, and a link connecting the end of said crank-arm with the gate outside the connection of the other link thereto, the same acting as a guard for the first crank-arm and link, substantially as described.

3. A gate having a spring-closed latch mounted to slide longitudinally upon the gate, an eye attached to said latch, a bent lever composed of a vertical and a horizontal member pivoted by the lower end of the vertical member below said latch, the vertical member of said lever passing through the eye, a yoke fixed to the frame and embracing the upper horizontal member to form a guide therefor, a shaft mounted horizontally above the gate and extending at right angles to the gate when in its closed position, operating-arms pivoted to the ends of said shaft so as swing in a plane which includes the shaft, a crank-arm upon the shaft near the gate-pivot, and a link connecting said crank-arm with the upper end of the bent latch-operating lever on the gate, substantially as described.

THEODORE SAWYER.

Witnesses:
ELIJAH CRAL,
HOMER V. MEEKER.